United States Patent [19]
Waxman et al.

[11] 3,886,640
[45] June 3, 1975

[54] HOUSING FOR THE CONTROLLED EXPOSURE OF FILM CASSETTE

[75] Inventors: Jay S. Waxman; Burton L. Siegal, both of Skokie, Ill.

[73] Assignee: G. D. Searle & Co., Chicago, Ill.

[22] Filed: Nov. 23, 1973

[21] Appl. No.: 418,230

[52] U.S. Cl. .............................................. 29/200 P
[51] Int. Cl. ............................................ B23p 19/00
[58] Field of Search .......... 29/200 D, 200 P, 200 R, 29/200 A, 208 R, 200 J

[56] References Cited
UNITED STATES PATENTS

| | | | |
|---|---|---|---|
| 3,447,223 | 6/1969 | Brown | 29/200 P |
| 3,548,478 | 12/1970 | Blackman | 29/200 D |
| 3,704,503 | 12/1972 | Haywood | 29/200 P |
| 3,722,055 | 3/1973 | D'Ercole et al. | 29/200 D |

*Primary Examiner*—Thomas H. Eager

[57] ABSTRACT

A housing is provided which is adapted for use in undertaking a scintillation camera study. The housing includes a chamber into which a cassette is inserted through an opening formed in a wall of the chamber. The cassette is retained in a predetermined station within the chamber by releasable means which resiliently engage peripheral portions of the cassette. An elongated guide means is fixedly mounted within the chamber and is adapted to slidably engage a guideway formed on the cassette and, thus, control the direction of movement of the cassette when the latter is being moved towards or away from the predetermined station. The guide means actuates a lock carried on the cassette to an unlocked position whereby a hingedly connected cover section of the cassette is free to be moved to an open position relative to a tray section when the cassette is disposed at the predetermined station thereby enabling the film carried within the cassette to be exposed. A cover section opening device is adjustably mounted within the chamber and disposed adjacent the predetermined station. The device, when actuated in one direction, will engage the cassette cover section and move same to an open film-exposing position. When the device is actuated in a second direction, the cover section will be engaged thereby and moved to a closed film-concealing position. When the device is actuated in one direction, an interlock will be actuated causing a door carried on the chamber wall to be retained in a closed relation with the chamber wall opening and, thus, provide a light-tight chamber.

15 Claims, 10 Drawing Figures

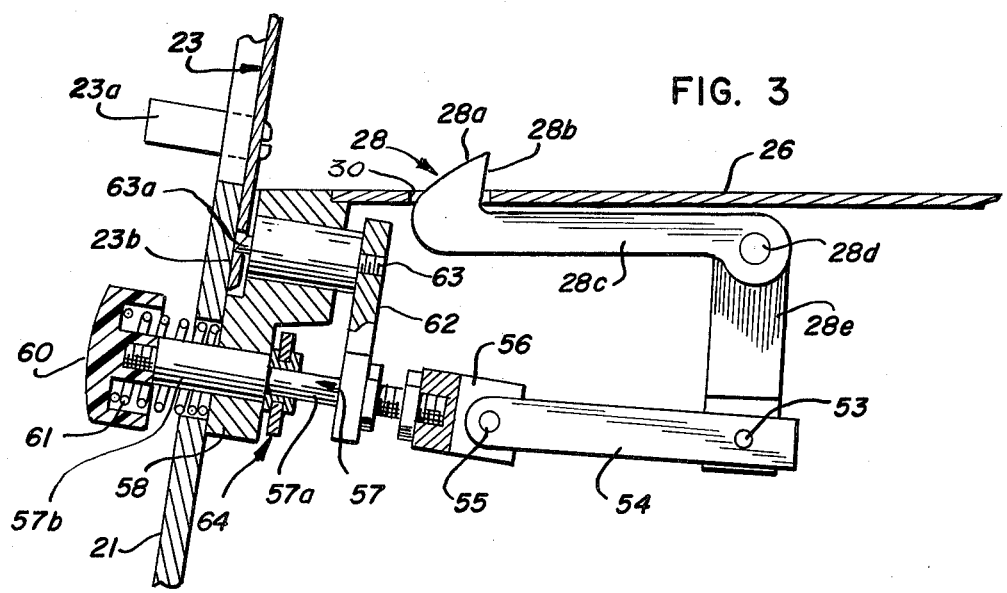
FIG. 3
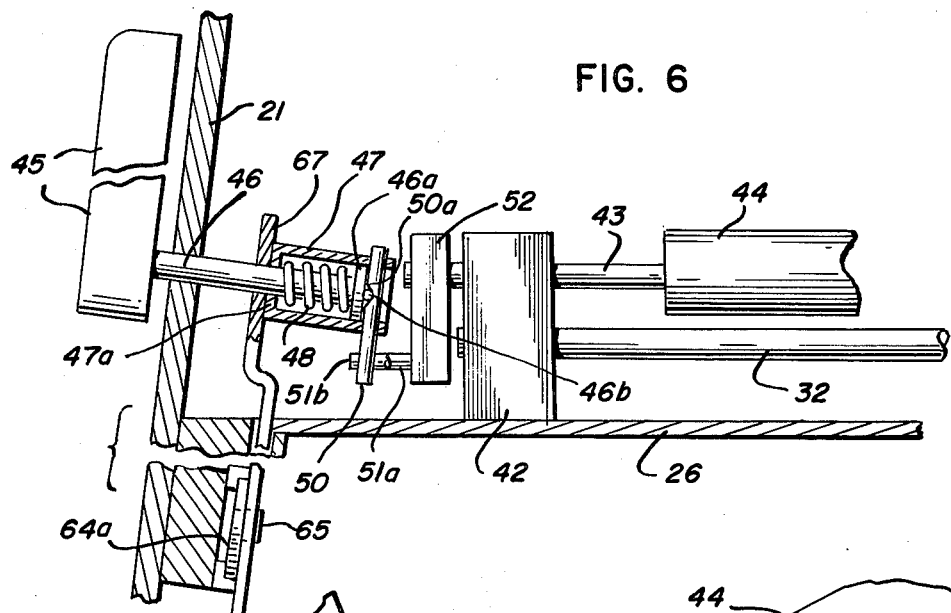
FIG. 6
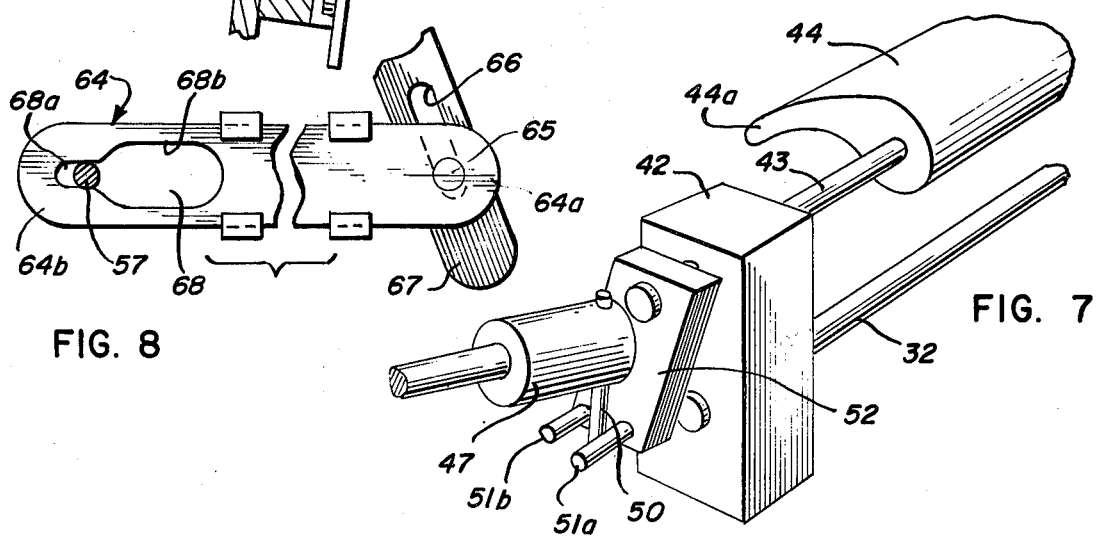
FIG. 8
FIG. 7

HOUSING FOR THE CONTROLLED EXPOSURE OF FILM CASSETTE

BACKGROUND OF THE INVENTION

The utilization of scintillation cameras by the medical profession in recent years has become widespread. Accessory equipment utilized in conjunction with such cameras, however, has in many instances been beset with one or more of the following shortcomings, thereby impairing its utility: (a) the equipment is of bulky, complex and costly construction; (b) frequent adjustment of the various components comprising the equipment is required in order to maintain accuracy and reliability of the equipment; (c) the equipment is incapable of accommodating film cassettes of varying size and configuration; and (d) the equipment is susceptible to prolonged and frequent periods of shutdown for repair and/or maintenance.

SUMMARY OF THE INVENTION

Thus, it is an object of the invention to provide a piece of accessory equipment which avoids the aforenoted shortcomings.

It is a further object of the invention to provide a housing for the controlled exposure of a film cassette which incorporates a plurality of safety features to prevent accidental exposure of the film within the cassette.

It is a still further object of the invention to provide a housing of the type described which will automatically indicate to the operator the size of the film cassette disposed within the interior of the housing and, in turn, the speed of the film contained within the cassette because of a predetermined correlation between the cassette size and the film speed.

It is a still further object of the invention to provide a film cassette utilized with the aforedescribed housing which is of simple yet sturdy construction and is provided with a feature whereby the cassette can be inserted into the housing interior only when the cassette assumes a predetermined oriented position.

Further and additional objects will appear from the description, accompanying drawings and appended claims.

In accordance with one embodiment of the invention, a housing of the type described is provided for use with a film cassette having a tray section and a cover section hingedly connected thereto and, when in a closed position, the sections cooperate to form a light-tight film pocket. The cassette also is provided with a releasable lock for retaining the sections in film pocket-forming relation. An elongated guideway is formed on the underside of the tray section in which normally protrudes a portion of the releasable lock. The housing includes an interior chamber having one wall thereof provided with an opening through which a cassette passes when being inserted into or removed from the chamber. An elongated guide is fixedly mounted within the chamber and is slidably accommodated within the guideway of the cassette when the latter is moved into or removed from the chamber. The guide and guideway cooperate with one another to direct the cassette towards a predetermined station within the chamber. When the cassette reaches the predetermined station, the guide will have engaged the portion of the cassette lock protruding into the guideway causing the lock to assume an unlocked position. An adjustable member is disposed within the chamber adjacent the predetermined station. When the member is actuated in one direction, it will engage the cassette cover section and move same to an open position with respect to the tray section. When the member is actuated in a second direction, however, it will return the cover section to the closed position. Means are provided within the chamber for releasably retaining the cassette at the predetermined station. A door is adjustably mounted on the chamber wall provided with the opening and is adapted to move between open and closed positions. An element is disposed within the chamber for releasably locking the door in a closed position relative to the chamber wall opening, thereby rendering the chamber light-tight. The element cannot be moved to a released position relative to the closed door when the member is opening the cover section of the cassette. The housing is provided with cassette size sensing means which automatically indicates the particular size of the cassette disposed within the chamber.

DESCRIPTION

For a more complete understanding of the invention, reference should be made to the drawings wherein FIG. 1 is a fragmentary perspective view of the front side of one form of the improved housing.

FIG. 3 is an enlarged fragmentary sectional view taken along line 3—3 of FIG. 1.

FIG. 6 is an enlarged fragmentary sectional view taken along line 6—6 of FIG. 1.

FIG. 7 is a fragmentary perspective view of one of the components disposed within the housing chamber.

FIG. 8 is a fragmentary front elevational view of a linkage disposed within the housing interior.

Figure 1:
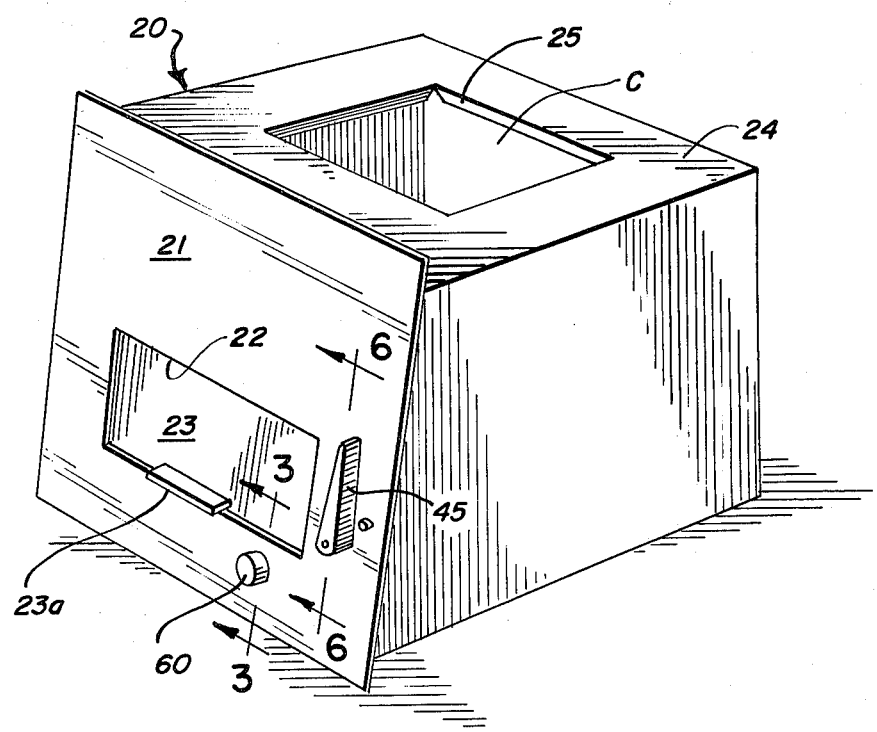

Referring now to the drawings and more particularly to FIG. 1, one form of a housing 20 is shown which is adapted to be used as an accessory in making a scintillation camera study. Cameras of this general type are in widespread use in numerous medical institutions in performing image studies of dynamic radioisotope distribution through various areas of the human body.

Housing 20 may be self-supporting or one of many components forming a console, not shown. The front exposed wall 21 of the housing is provided with an opening 22 which provides an entryway to a chamber C formed within the housing. A door 23 is slidably mounted on the concealed side of wall 21 and is adapted to be manually moved between open and closed positions. A handle 23a is provided on the door to facilitate movement thereof.

The upper wall 24 of the housing is provided with a suitable opening 25 for mounting therein a unit to which the film is to be exposed in a manner to be described more fully hereinafter. The rear wall of the housing may be provided with a conventional access panel, not shown.

Figure 2:
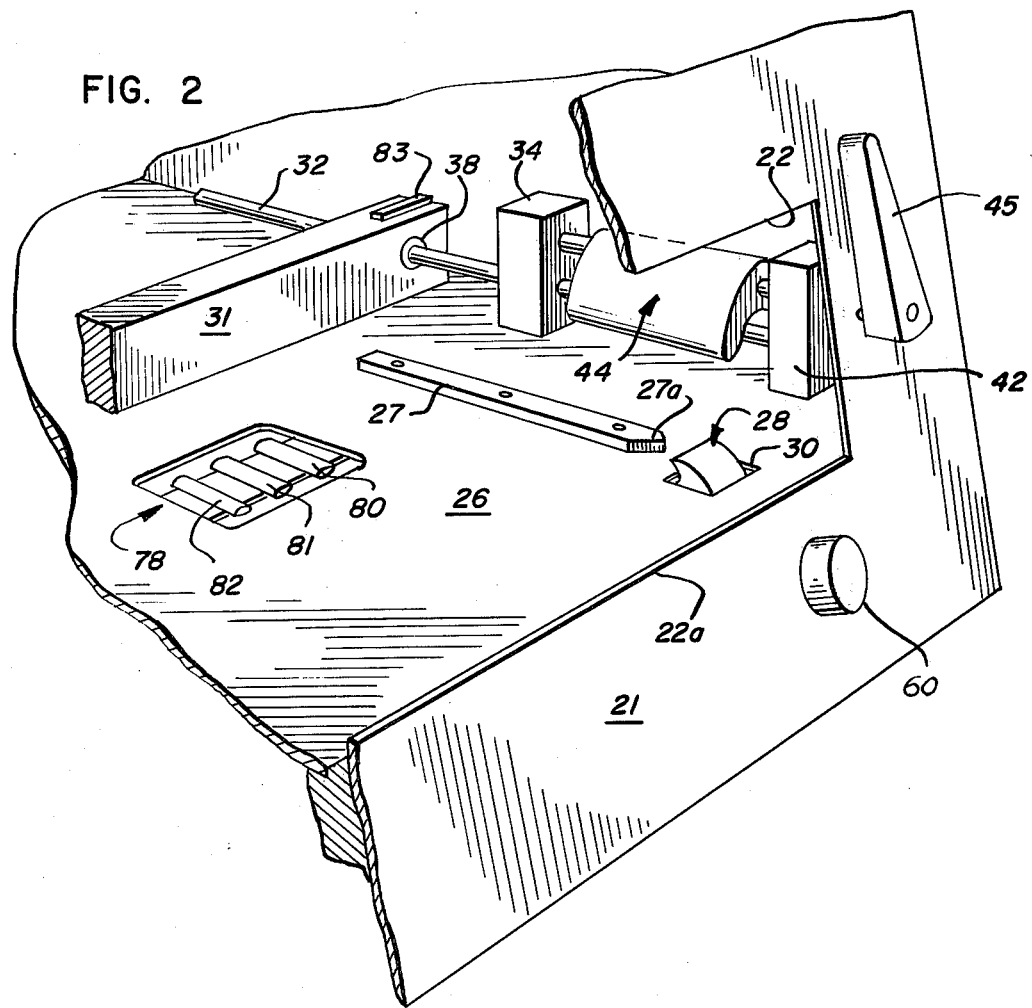
FIG. 2 is an enlarged fragmentary perspective view of the housing chamber and showing certain components disposed therein.

The chamber, as seen in FIG. 2, is provided with a base panel 26 of planar configuration. The lower peripheral segment 22a of the opening 22 is in substantially flush relation with the upper surface of panel 26. Mounted on the panel 26 and projecting upwardly therefrom is an elongated guide member or rail 27. The member 27 extends rearwardly and the end 27a thereof closest to the opening 22 is bevelled or tapered slightly. The function of the guide member will become apparent from the discussion to follow.

Positioned between the guide member end 27a and the opening 22 is a resilient depressible latch or stop 28. The latch protrudes upwardly through a suitable slot 30 formed in panel 26. The portion 28a of the latch surface disposed adjacent the wall opening 22 has a contoured configuration so as to provide a cam surface. The inwardly facing portion 28b of the latch surface is disposed substantially transversely of the panel surface. The latch works in combination with a tension bar 31 to retain a cassette W in a predetermined station X within the chamber, see FIG. 4. The cassette when located at station X is in registration with the opening 25 formed in the top wall 24 of the housing.

Figure 4:
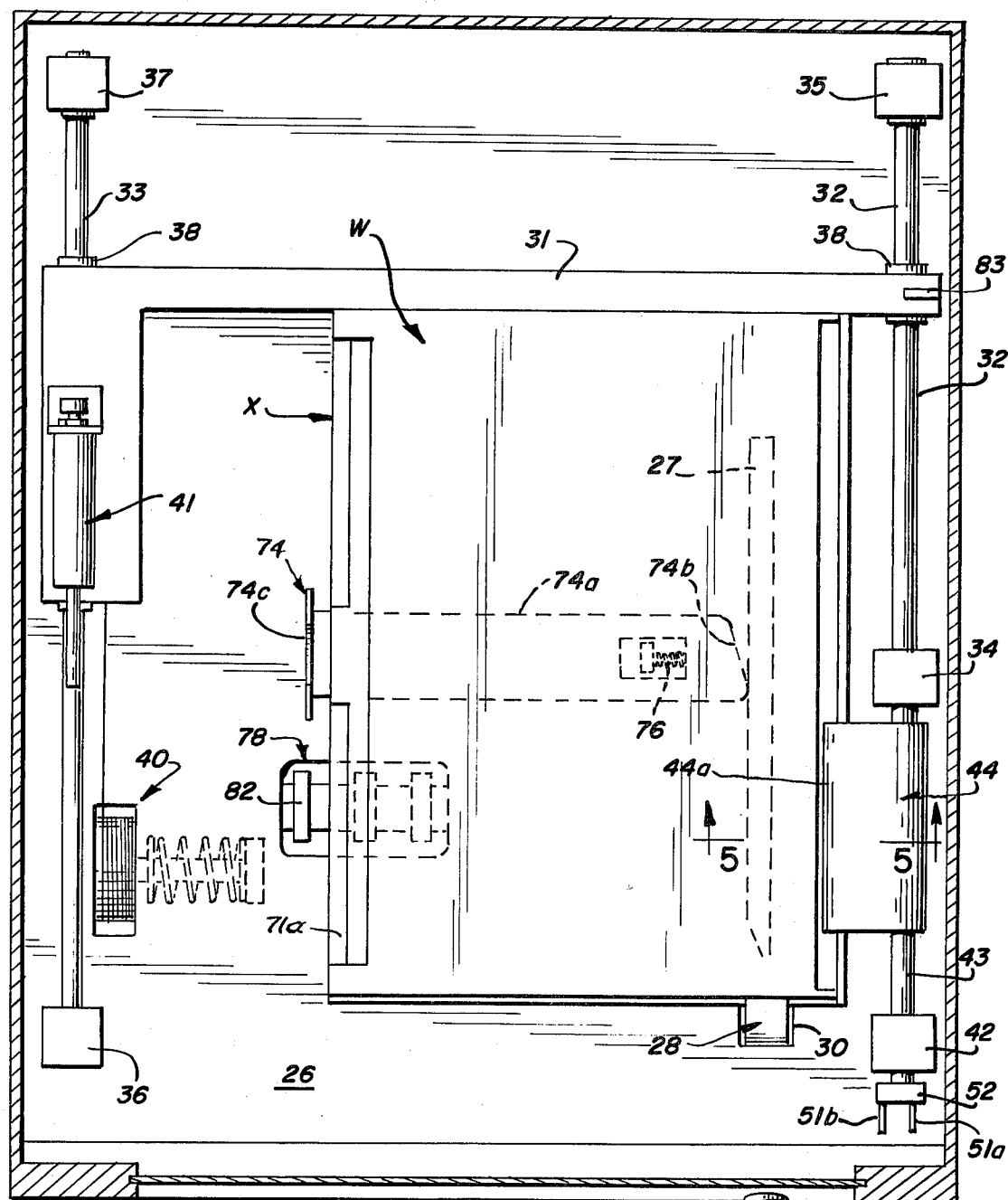
FIG. 4 is a fragmentary top plan view of the base of the housing chamber and showing a cassette disposed at the predetermined station.

Tension bar 31 is slidably mounted on a pair of spaced parallel rods 32 and 33 which are disposed on opposite sides of the opening 22 and extend rearwardly therefrom, see FIG. 4. The ends of each rod are supported by suitable brackets 34–35 and 36–37 mounted on and projecting upwardly from base panel 26. The ends of the bar 31 carry suitable bushings 38 which slidably accommodate the corresponding rods 32 and 33. The tension bar 31 is biased by a suitable spring assembly 40 to move in direction towards the opening 22. Thus, when a cassette is inserted into the chamber C in a manner to be hereinafter described, the bar 31 will be self-adjusting to the leading edge of the cassette and resiliently contact same so that when the trailing edge of the cassette clears the latch 28, the cassette will be firmly gripped between the bar and latch. To prevent abrupt movement of the tension bar 31 towards the opening 22, when the latch 28 is manually moved to a depressed or released position and to prevent the cassette from being rapidly ejected from the chamber by the bar, a conventional damper mechanism 41 is provided for the bar, see FIG. 4.

Bracket 34 cooperates with a bracket 42 mounted within the housing and the two brackets support the ends of an elongated axle or rod 43. Axle 43 is mounted so as to turn about its longitudinal axis. Fixedly mounted on axle 43 and adapted to move therewith is a finger-like element 44. The distal or free edge 44a of the element projects in a direction towards the guide member 27, see FIGS. 2 and 5. The longitudinal axes of rod 32 and axle 43, in the illustrated embodiment, are disposed in parallel offset relation. Furthermore, the rod 32 and axle 43 are disposed in spaced parallel relation with respect to the guide member 27.

Turning movement of axle 43 and finger-like element 44 is effected by a lever 45 located on the front wall 21 of the housing 20. The lever is connected to one end of a short rod 46 mounted on and disposed transversely of the front wall 21, see FIG. 6. The inner end 46a of rod 46 is provided with an annular collar which is disposed within a sleeve member 47. Disposed within the sleeve member and intermediate the collar and the outer end of the sleeve is a coiled spring 48. One end of the spring resiliently engages the closed end 47a of the sleeve and the opposite end of the spring engages the annular collar. Formed on the inner face of the annular collar is a diametrically extending protuberance 46b, the function of which will be described hereafter.

Extending transversely downwardly from the inner end of sleeve member 47 is a lug 50, the lower end of which is disposed between a pair of spaced parallel fingers 51a and b. The fingers project outwardly from an arm 52 keyed to the end of axle 43. Lug 50 is provided with a transverse V-shaped notch 50a in which the protuberance 46b of the rod collar is normally disposed, see FIG. 6. Thus, movement of lug 50 is transmitted to axle 43 through the fingers 51a and b and the arm 52. Protuberance 46b and notch 50a function as a clutch. When normal turning force is applied to the exposed lever, rod 46, spring 48, sleeve 47 and lug 50 will turn as a unit about rod 46 as an axis through a predetermined sector of approximately 45°. If, however, further turning force is applied to the lever, the protuberance 46a will become disengaged from the notch 50a thereby enabling the lever to continue to turn without causing breakage of any of the various parts.

Latch 28, as previously mentioned, projects upwardly through an opening 30 formed in the base panel 26. As seen in FIG. 3, the latch is provided with a leg portion 28c which is disposed beneath the base panel and mounted for pivotal movement about an axis 28d. A second leg portion 28e extends transversly downwardly from leg portion 28c and is provided with a pin 53 at its lower end. The pin is connected to one end of a link 54. The opposite end of link 54 is pivotally connected at 55 to a block 56 which, in turn, is fixedly connected to the inner end of a push rod 57. The push rod is slidably disposed within a suitable support 58 mounted on the housing wall 21. A knob 60 is affixed to the outer end of rod 57. Encompassing the rod and disposed between knob 60 and support 58 is a coil spring 61 which applies an outwardly directed biasing force to the knob and the rod 57 connected thereto.

Disposed intermediate the block 56 and the inner end of support 58 is a transversely extending arm 62. The arm is fixedly secured to the rod 57 and moves therewith. The upper end of arm 62 carries a transversely extending pin 63 which protrudes through a sleeve and has the outer end 63a thereof adapted to interlock with a ledge 23b carried on the concealed surface of the door 23 when the latter is disposed in a closed position, see FIG. 3. The outer end 63a of pin 63 is chamfered slightly so that when the door is moved to a closed position, the ledge 23b will engage the chamfered surface of pin 63 and will cam the pin inwardly to a retracted position thereby enabling the ledge to move past the retracted pin. The bias of spring 61 causes pin 63 to normally assume an extended position.

As aforementioned, when axle 43 and finger-like element 44 are rotated by manual movement of lever 45, the door 23 is retained in a closed locked position through a linkage 64, see FIGS. 6 and 8. Linkage 64 is mounted on the concealed surface of wall 21 and is adapted to move in an endwise direction only. One end 64a of the linkage is provided with a transversely extending pin 65 which is adapted to be disposed within an elongated slot 66 formed in an elongated transversely extending arm 67 fixedly mounted on the rod 46 to which lever 45 is connected. Thus, arm 67 and lever 45 will turn as a unit about rod 46 as an axis.

As seen in FIG. 8, the opposite end 64b of the linkage 64 is provided with an elongated longitudinally extending slot 68. One end 68a of the slot 68 is of reduced size and approximates the diameter of the smaller portion 57a of the push rod 57, see FIG. 3. The opposite end 68b of the slot 68 is enlarged and is sized so that the larger portion 57b of the rod will slide therethrough when the knob 60 is depressed. Thus, when the rod portion 57b is aligned with slot portion 68b, the knob 60 can be manually depressed whereupon arm 62 will move pin 63 to a retracted position thereby releasing door 23 so that it may be manually opened. Simultaneously with the movement of the door release pin 63, the latch 28 is depressed, whereupon the cassette will be automatically ejected through the wall opening 22.

On the other hand, when the rod portion 57a is disposed within slot portion 68a of the link 64, the knob 60 cannot be depressed because the end of rod portion 57b cannot pass through slot portion 68a. In lieu of the arm 67, a conventional solenoid or other suitable means may be used for actuating the linkage 64.

Figure 5:
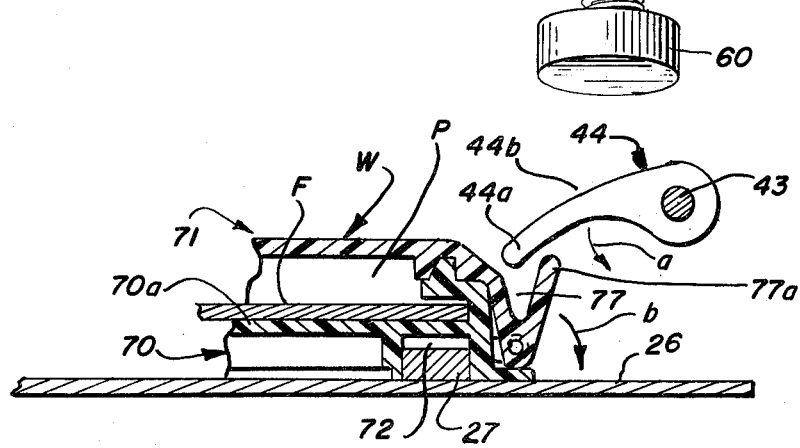
FIG. 5 is an enlarged fragmentary sectional view taken along line 5—5 of FIG. 4.

Cassette W as seen more clearly in FIGS. 4, 5, 9 and 10 comprises a tray section 70 having a panel 70a formed therein on which is placed film F. Hingedly connected along one side of the tray section is a cover section 71 which is adapted to be manually moved between a closed position as seen in FIG. 5 and an open position wherein the film is exposed. When the cover section assumes a closed position, a light-tight pocket P is formed between the panel 70a and the cover section. The underside of panel 70a is provided with an elongated guideway or groove 72 which is sized so as to accommodate the guide member 27 mounted on the base panel 26 of the chamber C. The guideway is spaced inwardly from and is substantially parallel to the hinge axis of the cover section 71. Reinforcing ribs or struts 73 are formed on the underside of panel 70a.

Figure 9:
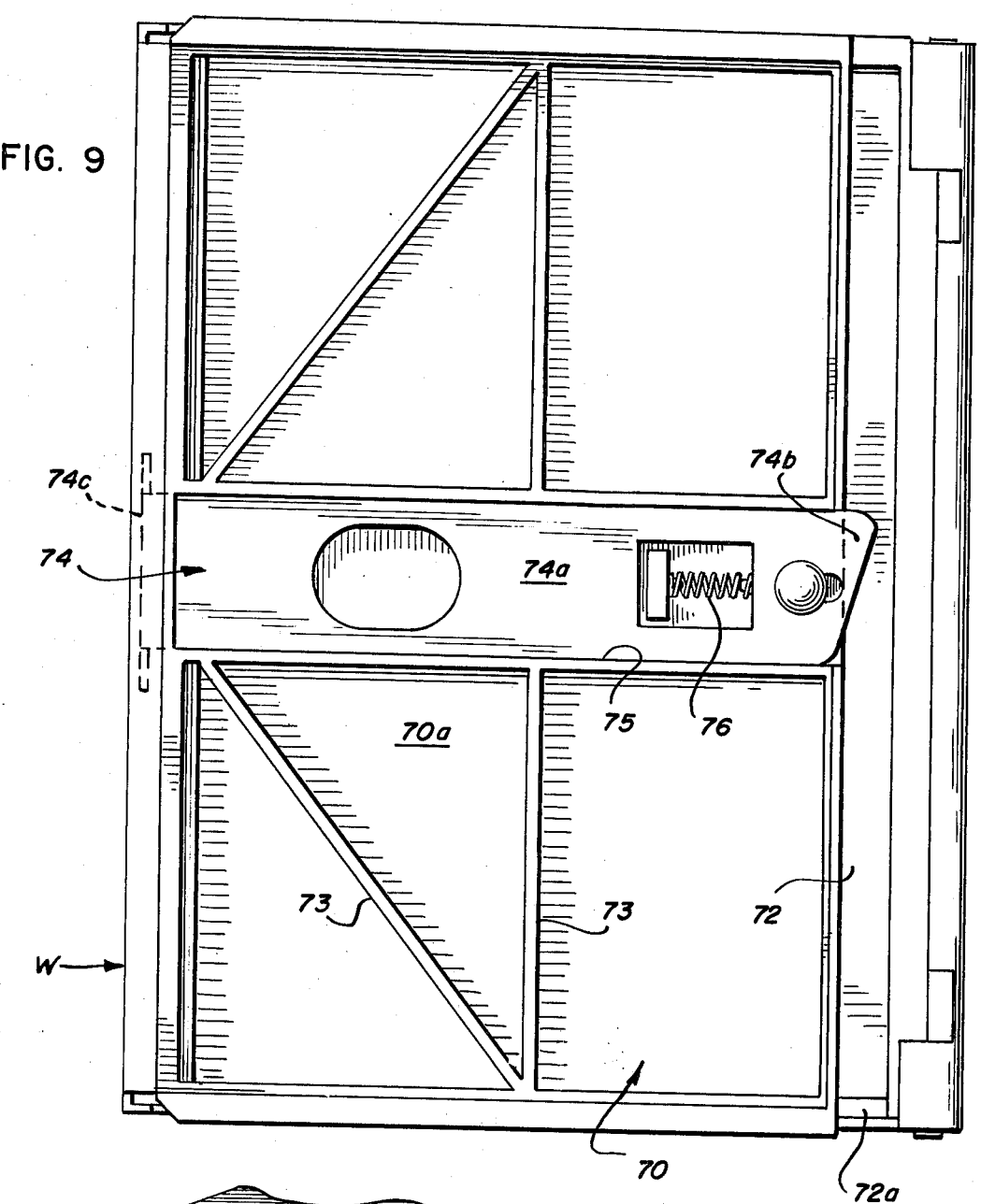
FIG. 9 is a bottom plan view of one form of the cassette shown in FIG. 4.

As seen in FIG. 9, one end 72a of the guideway is open so as to allow the end 27a of the guide member 27 to enter the guideway 72 when the cassette W is inserted through the opening 22 into the chamber C. The guide member 27 coacts with the guideway 72 so as to guide the cassette into the proper position X relative to the opening 25 formed in the top 24 of the housing.

Centrally disposed on the underside of panel 70a of the tray section 70 is a lock 74 which is adapted to retain the cover and tray sections in a closed relation. The lock 74 has an elongated central portion 74a which is slidably disposed within a groove 75 which is transversely disposed relative to the guideway 72. One end 74b of the lock protrudes into the guideway 72 and has a cam surface which is adapted to be engaged by the guide member 27 when the cassette W is moved into position or station X. The lock 74 is biased by a spring 76 to assume the position seen in FIG. 9.

Figure 10:
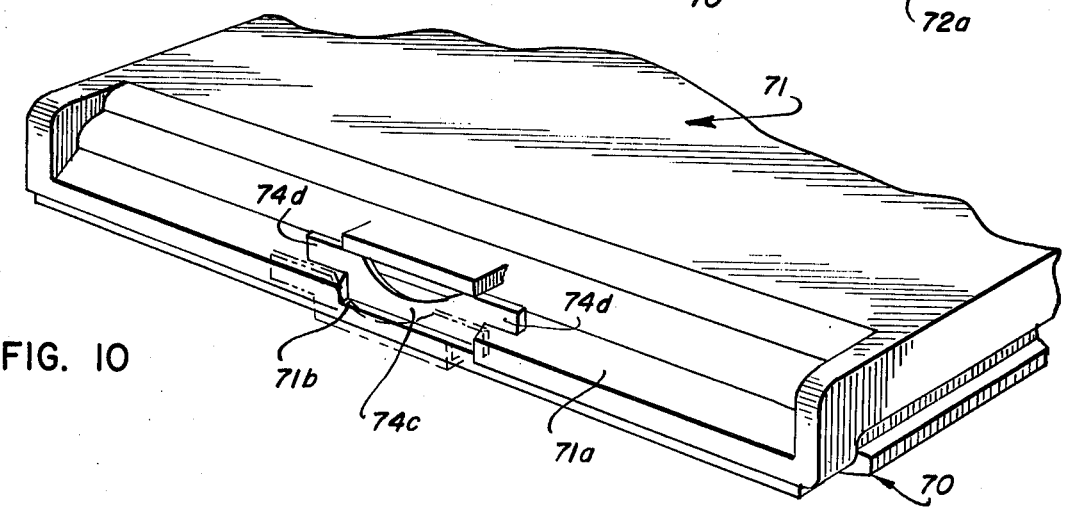
FIG. 10 is a fragmentary perspective view of the peripheral portion of the cassette of FIG. 9 and showing the releasable lock mounted thereon.

The opposite end 74c of the lock is exposed, as seen in FIG. 10, and protrudes upwardly a slight amount. The lock end 74c includes a pair of shoulders 74d which are adapted to overlie a lip 71a formed on the peripheral portion of the cover section 71 opposite the hinge axis for the cover section. A slot 71b is formed in the lip to allow the lock portion 74a to slide therethrough. When the end 74b of the lock is engaged by the guide member 27, the lock will be moved to the left, as viewed in FIG. 9, thereby causing the end 74c of the lock to assume a released position (see phantom lines FIG. 10), thereby disengaging the shoulders 74d from the cover section lip 71a. Once the lock 74 is in its released position, the cover section 71 is free to be rotated to an open position by the finger-like element 44. To enable the element to rotate the cover section, a V-shaped groove 77 is formed on the upper surface of the cover section adjacent the cover section hinge. The groove 77 is sized and shaped so that it will accommodate the free edge 44a of the element 44, see FIG. 5. When element 44 is rotated in a counter-clockwise direction, see arrow a, about axle 43, the edge 44a will engage a side or flange 77a of the groove 77 and cause the cover section to rotate in a clockwise direction, see arrow b. Once the cover section is in an open position, it will remain there until the handle and the element 44 move in a clockwise direction whereupon the gently curved surface 44b will contact the cover section and return same to a closed position with respect to the tray section 70.

Mounted on base panel 26 of the chamber C and spaced from the guide member 27 is a sensing device 78 which automatically registers the size of the cassette W, which is disposed at station X. The device 78 includes a plurality of laterally spaced switches 80, 81 and 82 which are spaced at progressively greater distances from the guide member 27, see FIG. 2. Thus, depending upon the size of the cassette being accommodated in the chamber, only one of the switches will be depressed when the cassette is at station X.

Tension bar 31 also carries a contact 83 at one end which is adapted to contact suitable switches, not shown. Which of the latter switches will be engaged by the contact 83 will depend upon the relative position of the bar 31 when it is engaging the leading edge of the cassette disposed at station X. The size of the cassette is correlated to the speed of the film F accommodated in the cassette. Thus, an accurate means is provided for determining the type of film disposed within the cassette. The closing of the various switches 80–82 by the cassette and the closing of the switches by the tension bar contact 83 may be indicated on a control panel, not shown. The size and shape of the housing and the cassettes to be accommodated therein may be varied from that shown without departing from the scope of the invention herein described and claimed.

Thus, it will be seen that a housing of the type described has been provided which is of simple yet compact construction, is adapted to accommodate various size cassettes, and is provided with various foolproof devices to prevent accidental exposure of the film within the cassette once the latter is disposed within the housing.

We claim:

1. A housing for controlled exposure of a film cassette wherein the latter has a tray section, a cover section hingedly connected thereto, a releasable lock for retaining the cover section in a closed relation with respect to the tray section, and an elongated guideway formed in the underside of the tray section, said housing comprising a light-tight chamber having a wall provided with an opening through which a closed cassette is adapted to pass; a door mounted on said chamber wall for movement between either an open or closed position with respect to the chamber wall opening; a cassette-supporting base forming a surface of the chamber and provided with an elongated protruding guide means for being slidably disposed within the cassette guideway when the cassette is inserted into or removed from the chamber through the chamber wall opening, said guide means effecting release of the cassette lock when the cassette assumes a predetermined station within the housing chamber; means adjustably mounted within said chamber and adapted when actuated in one direction to effect opening of the cassette cover section to permit exposure of the film when the cassette has assumed said predetermined station, and when actuated in a second direction to effect closing of the cassette cover section; releasable means within said chamber for retaining a cassette at said predetermined station; and locking means movably mounted on said housing for retaining said door in a closed position when the cassette cover section is in an open position.

2. The housing of claim 1 wherein the means for opening and closing the cassette cover section when the cassette is disposed at said predetermined station, includes a pivotally mounted finger having a distal end thereof adapted to engage a peripheral portion of the cassette cover section and impart an opening force thereto when said means is actuated in said one direction; and an exposed handle means adjustably mounted on said housing for manually exerting pivotal force on said finger.

3. The housing of claim 1 whereby the means for opening and closing the cassette cover section is interconnected to said door locking means and prevents movement of the latter to a door unlocking position when said first-mentioned means has been actuated to a cassette cover section opening position.

4. The housing of claim 1 wherein movement of said door locking means to a door unlocking position effects movement of the cassette retaining means to a release position.

5. The housing of claim 1 wherein the releasable means for retaining a cassette in a predetermined station includes a depressible first component resiliently mounted on said cassette-supporting base and adjacent said chamber wall opening, and a second component retractably mounted within said chamber for movement towards or away from said chamber wall, said second component being biased in a direction towards said chamber wall; said first and second components being adapted to resiliently engage opposite peripheral portions of a cassette when the latter is disposed at said predetermined station.

6. The housing of claim 1 wherein said cassette-supporting base includes a cassette-size sensing means, said sensing means including a plurality of spaced switches, each switch being laterally spaced a different predetermined distance from the longitudinal axis of said guide means, each switch being adapted to be engaged and actuated by a cassette of a predetermined size when the latter is disposed at said predetermined station.

7. The housing of claim 2 wherein said handle means includes an exposed lever pivotally mounted on a wall of said chamber, said lever being movable through a predetermined sector to effect pivotal movement of said finger.

8. The housing of claim 7 wherein said handle means includes an over-run clutch; said clutch being provided with a first component connected to said finger and movable therewith, a resilient second component having a portion thereof connected to the lever and movable therewith, and a third component connected to a second portion of said second component, movement of said lever being transmitted to said third component only through said second component, said second component being provided with means for transmitting movement of said third component to said first component.

9. The housing of claim 8 wherein said third component is concentrically disposed relative to the pivotal axis of said lever.

10. The housing of claim 9 wherein the pivotal axis of the finger is disposed in a position other than in coaxial alignment with the pivotal axis of the lever.

11. The housing of claim 5 wherein the direction of movement of the second component of the releasable means is in a direction substantially parallel to the longitudinal axis of the elongated guide means.

12. A housing for permitting controlled exposure of a film cassette wherein the latter has a tray section, a cover section hingedly connected thereto, a releasably lock for retaining the cover section in a closed relation with respect to the tray section, and guide means disposed on the tray section, said housing comprising a light-tight chamber for accommodating a cassette subsequent to the latter passing through an opening formed in a chamber wall, a door mounted on said chamber wall for movement between either an open or closed position with respect to said chamber wall opening; cassette-supporting first means within said chamber and provided with releasable second means for resiliently retaining a cassette at a predetermined station; stationary guide third means within said chamber for coacting with the cassette guide means to restrict movement of the cassette along a predetermined path when the cassette is being moved towards or away from the predetermined station and effecting release of the cassette lock when the cassette is at said predetermined station; fourth means adjustably mounted within said chamber and adjacent said predetermined station and adapted to be actuated in one direction to effect movement of the cassette cover section to an open position and to be actuated in a second direction to effect movement of the cassette cover section to a closed position; and locking fifth means movably mounted on said housing for retaining said door in a closed position, said fifth means being held in a door-restraining position when said fourth means is actuated in said one direction.

13. In a housing for controlled exposure of a film cassette, said cassette comprising a first section; a second section hingedly connected to said first section and when in a closed position cooperating with said first section to form a light-tight film pocket, said second section being provided with an elongated flange parallel to and spaced to one side of the hinged axis; an adjustable lock carried by one section and adapted to interlock with the other section when said sections are in closed relation, said lock being spaced to the opposite side of the hinged axis; and an elongated guideway formed on the exposed surface of the section carrying said adjustable lock, said guideway being in substantially parallel spaced relation with respect to the hinged axis; said adjustable lock having a portion thereof normally protruding into said guideway when said lock is disposed in an interlocking relation, said lock portion being engaged and moved out of said guideway and assuming an unlocked relation when said cassette is positioned within the housing.

14. The film cassette of claim 13 wherein said first section constitutes a tray section and said second section constitutes a cover section and said guideway is formed on the underside of said tray section.

15. The film cassette of claim 14 wherein said elongated guideway is a rectilinear groove open at one end and extending substantially across the entire underside of the tray section.

* * * * *